United States Patent
Long et al.

(10) Patent No.: US 12,244,713 B2
(45) Date of Patent: Mar. 4, 2025

(54) SNAPSHOT TRANSFER FOR CLOUD-BASED STORAGE ACROSS ACCOUNTS

(71) Applicant: Capital One Services, LLC, McLean, VA (US)

(72) Inventors: Steven P. Long, Glen Allen, VA (US); Volkan Senkaynak, Wilmington, DE (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/363,974

(22) Filed: Aug. 2, 2023

(65) Prior Publication Data

US 2023/0379158 A1 Nov. 23, 2023

Related U.S. Application Data

(63) Continuation of application No. 17/132,276, filed on Dec. 23, 2020, now Pat. No. 11,743,046.

(51) Int. Cl.
| | |
|---|---|
| H04L 9/32 | (2006.01) |
| G06F 16/11 | (2019.01) |
| G06F 21/60 | (2013.01) |
| H04L 9/08 | (2006.01) |
| H04L 9/40 | (2022.01) |

(52) U.S. Cl.
CPC ............ *H04L 9/321* (2013.01); *G06F 16/128* (2019.01); *G06F 21/602* (2013.01); *H04L 9/0819* (2013.01); *H04L 63/102* (2013.01)

(58) Field of Classification Search
None
See application file for complete search history.

(56) References Cited

U.S. PATENT DOCUMENTS

| | | | |
|---|---|---|---|
| 10,346,618 B1* | 7/2019 | Ah Kun | G06F 12/1408 |
| 2015/0319144 A1* | 11/2015 | Barton | G06F 9/544 |
| | | | 713/168 |
| 2019/0132299 A1* | 5/2019 | Tucker | H04W 12/0431 |
| 2022/0200804 A1 | 6/2022 | Long et al. | |

OTHER PUBLICATIONS

Burrough M., "Pentesting Azure Applications," No Starch Press, San Francisco, 2018, 209 pages.

* cited by examiner

*Primary Examiner* — Brandon Hoffman
(74) *Attorney, Agent, or Firm* — Harrity & Harrity, LLP

(57) ABSTRACT

In some implementations, a system may receive a first credential associated with a first account and a second credential associated with a second account and may instruct a cloud service, using the first credential, to generate a first snapshot of structured source data associated with the first account. The system may authorize the first account and the second account to use a master encryption key and instruct the cloud service to encrypt the first snapshot using the master encryption key. The system may instruct the cloud service, using the second credential, to copy the first snapshot to a second snapshot associated with the second account and to decrypt the second snapshot into structured target data using the master encryption key. The system may deauthorize the first account and the second account from using the master encryption key and output an indicator of completion to a user device.

20 Claims, 8 Drawing Sheets

```
rxcopy –y status-standalone-1.yaml
{
  "jobStatusRequests": [
    {
      "id": 2,
      "jobID": "e973092-c-665b-40eb-92a5-4639f3768110:sa:08619382561 0:sr:us-east-1:ta:9415881283598:trus-west-2:eid:ux317",
      "jobName": "standalone-1",
      "isRunning": true,
      "jobStatus": "completed creating manual snapshot",
      "percentProgress": "25",
      "jobDuration": "7m 56s",
      "startTimeStamp": "2020-08-04 13:03:41",
      "endTimeStamp": null,
      "sourceAwsAccountNumber": "12345678910",
      "sourceSnapshotRegion": "us-east-1",
      "sourceSnapshotArn": "arn:aws:rds:us-east-1:12345678910:snapshot:qutestpgs-20080413 0332-manual",
      "targetAwsAccountNumber": "10987654321",
      "targetSnapshotRegion": "us-west-2",
      "targetSnapshotArn": null,
      "stepFunctionExecutionName": "qutestpgs.e973092c-665b-40eb-92a5-4639f3768110"
    }
  ]
}
```

FIG. 2

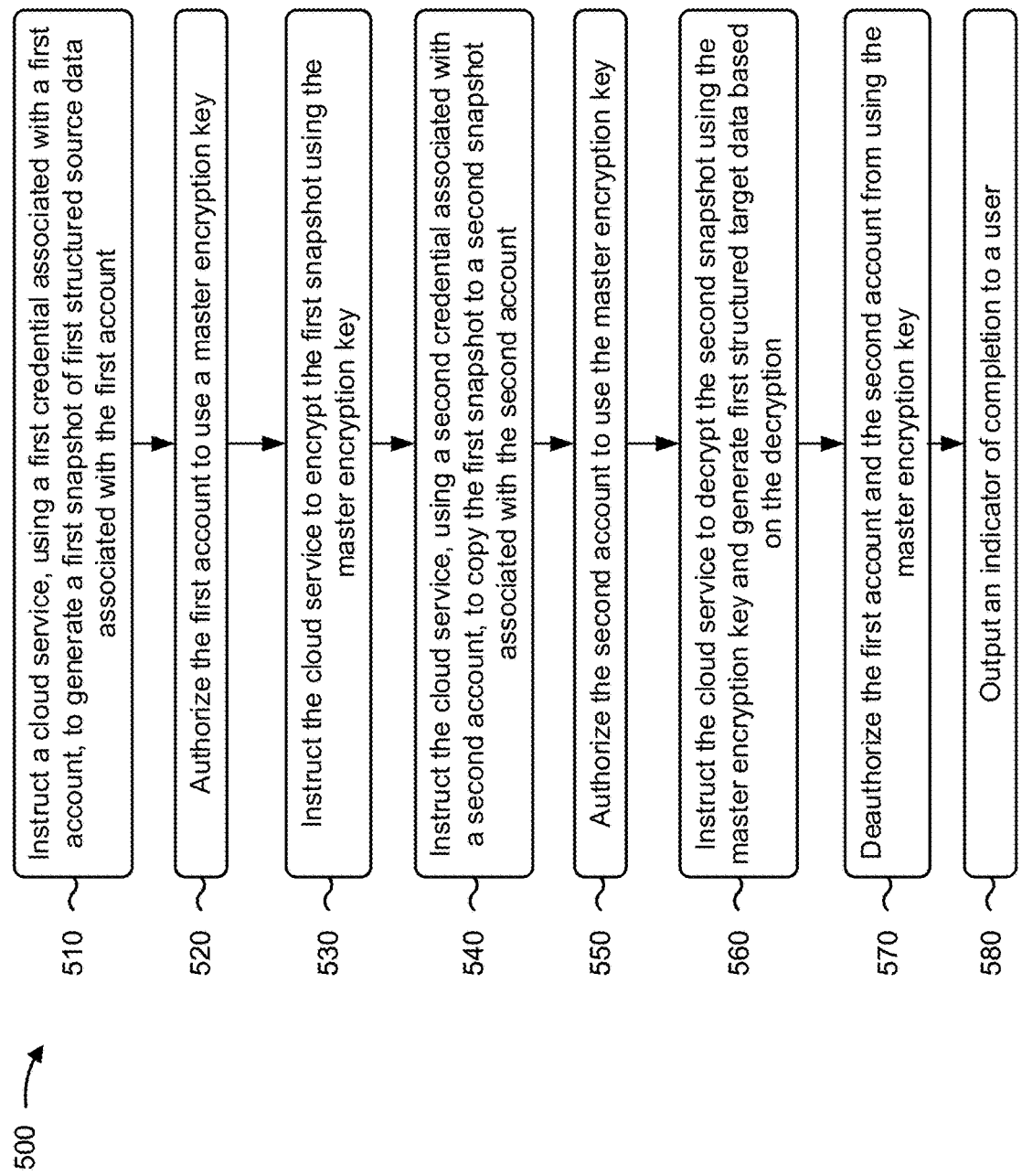

SNAPSHOT TRANSFER FOR CLOUD-BASED STORAGE ACROSS ACCOUNTS

RELATED APPLICATION

This application is a continuation of U.S. patent application Ser. No. 17/132,276, filed Dec. 23, 2020 (now U.S. Pat. No. 11,743,046), which is incorporated herein by reference in its entirety.

BACKGROUND

Some cloud services, such an Amazon Web Services® (AWS®), provide storage for structured data, such as relational data (e.g., Amazon's Relational Database Service), graphical data, files with metadata (e.g., Amazon's Elastic Block Store), and so on. Each storage may be associated with an account (e.g., a particular user) as well as a particular region (e.g., a physical subset of servers grouped by geographic proximity, such as East, West, and so on).

SUMMARY

In some implementations, a system for transferring storage snapshots across accounts in a cloud environment includes one or more memories and one or more processors, communicatively coupled to the one or more memories, configured to: receive a first credential associated with a first account for a cloud service and a second credential associated with a second account for the cloud service; instruct the cloud service, using the first credential, to generate a first snapshot of structured source data associated with the first account; authorize the first account and the second account to use a master encryption key; instruct the cloud service to encrypt the first snapshot using the master encryption key; instruct the cloud service, using the second credential, to copy the first snapshot to a second snapshot associated with the second account; instruct the cloud service to decrypt the second snapshot using the master encryption key and generate structured target data, associated with the second account, based on the decryption; deauthorize the first account and the second account from using the master encryption key; and output an indicator of completion to a user device.

In some implementations, a method of transferring storage snapshots across accounts in a cloud environment includes receiving a first credential associated with a first account for a cloud service and a second credential associated with a second account for the cloud service; instructing the cloud service, using the first credential, to generate a first snapshot of first structured source data associated with the first account; authorizing the first account and the second account to use a master encryption key; instructing the cloud service to encrypt the first snapshot using the master encryption key; instructing the cloud service, using the second credential, to copy the first snapshot to a second snapshot associated with the second account; instructing the cloud service to decrypt the second snapshot using the master encryption key and generate first structured target data, associated with the second account, based on the decryption; instructing the cloud service, using the first credential, to generate a third snapshot of second structured source data associated with the first account; instructing the cloud service to encrypt the third snapshot using the master encryption key; instructing the cloud service, using the second credential, to copy the third snapshot to a fourth snapshot associated with the second account; instructing the cloud service to decrypt the fourth snapshot using the master encryption key and generate second structured target data, associated with the second account, based on the decryption; deauthorizing the first account and the second account from using the master encryption key; and outputting an indicator of completion to a user device.

In some implementations, a non-transitory computer-readable medium storing a set of instructions includes one or more instructions that, when executed by one or more processors of a device, cause the device to: instruct a cloud service, using a first credential associated with a first account, to generate a first snapshot of first structured source data associated with the first account; authorize the first account to use a master encryption key; track accounts authorized to use the master encryption key; instruct the cloud service to encrypt the first snapshot using the master encryption key; instruct the cloud service, using a second credential associated with a second account, to copy the first snapshot to a second snapshot associated with the second account; authorize the second account to use the master encryption key; instruct the cloud service to decrypt the second snapshot using the master encryption key and generate first structured target data, associated with the second account, based on the decryption; deauthorize the first account from using the master encryption key based on determining that no additional jobs are associated with the first account; deauthorize the second account from using the master encryption key based on determining that no additional jobs are associated with the second account; and output an indicator of completion to a user.

BRIEF DESCRIPTION OF THE DRAWINGS

FIG. 2 is a diagram of an example log file output by systems and/or methods described herein.

FIG. 5 is a flowchart of an example process relating to transferring snapshots for cloud-based storage across accounts.

DETAILED DESCRIPTION

Figure 1A:
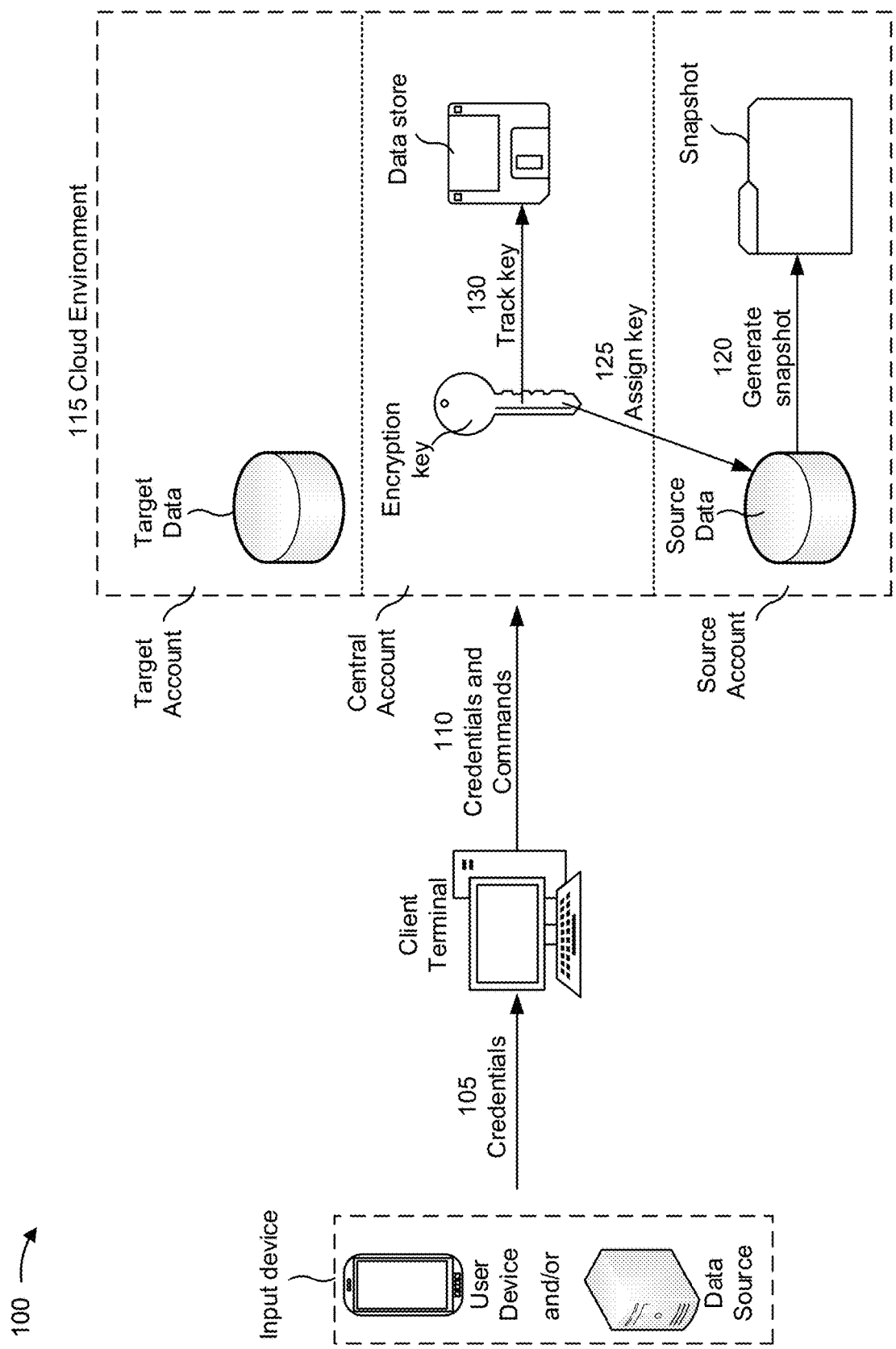
FIGS. 1A-1D are diagrams of an example implementation relating to transferring snapshots for cloud-based storage across accounts.

The following detailed description of example implementations refers to the accompanying drawings. The same reference numbers in different drawings may identify the same or similar elements.

Structured data stored on a cloud environment is generally associated with a particular account (e.g., a particular user). For example, the structured data may be stored on physical and/or logical partitions, of memories of the cloud environment, that are associated with that user. Additionally, or alternatively, the structured data may be encrypted using one or more local encryption keys associated with that user. Structured data may include relational data (e.g., in a tabular data structure), graphical data (e.g., a graphical database), files with metadata (e.g., stored on a formatted storage), and so on. In some examples, the structured data may also be associated with a particular region. For example, a region may include a physical subset of servers (forming the cloud environment) that are grouped by geographic proximity, such as servers within a threshold distance of a focal point, servers within a preconfigured geographic zone, and so on.

Some techniques for copying of structured data from one account to another account, as well as from one region (e.g., one physical subset of servers, as described above) to another, generally result in a loss of structure. For example, relational data may be exported as comma separated values (CSVs) and copied to another account, but the structure of that data must be reconstructed thereafter. In another example, files may be copied from one account to another, but at least some metadata (e.g., dates and times of creation, dates and times of last access, and so on) will be lost in the process. Additionally, some techniques for copying of structured data from one account to another account can be unsafe. Because each account is associated with different local encryption keys, and each account generally is not permitted to access the local encryption keys for other accounts, the data is often unencrypted during transfer and thus vulnerable to interception.

By copying using snapshots rather than directly copying data from one account to another account, structure may be preserved. For example, the snapshot may include a disk image file that captures both files and metadata on the formatted disk, a database image that captures data and associated structure (e.g., tabular structure or graphical structure), and so on. Generating snapshots is more resource intense than copying data but is more accurate. Moreover, generating snapshots conserves resources as compared with reconstructing metadata and/or structure after copying data. Some implementations described herein enable copying of structured data, in a cloud environment, from one account to another account using snapshots. As a result, the structured data is copied faster (e.g., more efficiently because structure need not be reconstructed) as well as more accurately (e.g., metadata is not lost when files are transferred).

Additionally, it can be difficult to copy snapshots across accounts because many cloud services do not allow sharing local encryption key across accounts. Generally, cloud services disallow such sharing because the sharing would result in vulnerabilities to all data encrypted with the shared local encryption keys. Accordingly, some implementations described herein enable snapshots to be securely shared across accounts without requiring sharing of local encryption keys for those accounts. Instead, some implementations described herein enable encryption of snapshots using a master encryption key during transfer, which is only temporarily shared with the accounts. As a result, the structured data is copied securely and without exposing local encryption keys across accounts.

FIGS. 1A-1D are diagrams of an example 100 associated with transferring snapshots for cloud-based storage across accounts. As shown in FIGS. 1A-1D, example 100 includes an input device (e.g., a user device and/or a data source), a client terminal, and a cloud environment 115. These devices are described in more detail in connection with FIGS. 3 and 4.

As shown by reference number 105, the input device may provide credentials to the client terminal. For example, the client terminal may request credentials in order to transfer structured data across accounts for a cloud service. The client terminal may have received a request to perform the transfer (e.g., from the input device) or may determine to perform the transfer (e.g., based on a stored schedule). As an alternative, the input device may provide the credentials along with a request for the client terminal to perform transfer of structured data across accounts.

The credentials may include a first credential associated with a first account for the cloud service and a second credential associated with a second account for the cloud service. In some implementations, the credentials may further include a third credential associated with a third account for the cloud service, a fourth credential associated with a fourth account for the cloud service, and so on. Accordingly, the client terminal may request all credentials required to perform a batch job for multiple accounts, and the input device may provide those credentials based on the request.

In some implementations, the input device may include a user device, such as a smartphone, a laptop, a desktop computer, or another similar device. Accordingly, a user may input or otherwise store the credentials on the user device. Credentials may include an access key (e.g., a secure shell (SSH) key, a public key infrastructure (PKI) certificate, and so on), a username and password (or personal identification number (PIN) or passcode), or any other information used for authentication. Additionally, or alternatively, the input device may include a data source, such as a server, a cloud storage device, or another similar source of data. Accordingly, the data source may retrieve or otherwise store the credentials. For example, the data source may compile the credentials from one or more users (e.g., via corresponding user devices).

In some implementations, the client terminal may include a user device, such as a smartphone, a laptop, a desktop computer, or another similar device. Accordingly, in some implementations, the client terminal and the input device may be the same device. As an alternative, the input device may include a first user device that sends one or more credentials to the client terminal, which includes a second user device. Additionally, or alternatively, the client terminal may include a local server or a remote computing device.

As shown by reference number 110, the client terminal may provide the credentials to the cloud environment 115. The client terminal may also provide one or more commands to the cloud environment 115. For example, one or more steps performed within the cloud environment 115 in FIGS. 1A-1D may be performed based on instructions from the client terminal. In some implementations, the instructions may be provided sequentially by the client terminal. Additionally, or alternatively, at least some of the instructions may be uploaded as a script or otherwise provided as a set of instructions to the cloud environment 115. In some implementations, cloud environment 115 may schedule, using a load balancer, execution of the instructions from the client terminal.

In some implementations, the cloud environment 115 may store structured data on one or more servers or other computing hardware (e.g., memory). For example, the cloud environment 115 may store relational data, graphical data, files with metadata, and/or other structured data associated with multiple accounts. As shown in FIGS. 1A-1D, the cloud environment 115 may store data associated with a source account and may store data associated with a target account. Although the description below will focus on one source account and one target account, the description similarly applies to batch jobs that include multiple source accounts and/or multiple target accounts. In some implementations, the cloud environment 115 may further store the structured data across multiple regions (e.g., on servers or computing hardware physically located in different geographic regions).

As further shown in FIGS. 1A-1D, the cloud environment 115 may provide access for a central account. For example, the central account may be created by an administrator of the client terminal or otherwise associated with the client terminal for use in copying structured data within the cloud environment 115. Accordingly, the central account may have access to a key distribution center (KDC) or another key repository. Moreover, the central account may be configured to share keys, from the key repository, with the source account and the target account.

As shown by reference number 120, the client terminal may instruct the cloud environment 115 to generate a snapshot of structured source data associated with the source account. For example, the structured source data may include a formatted disk (e.g., storing files with metadata), and the snapshot may include a disk image file (e.g., a .vmdk file, a .vmsd file, a .vmsn file, and so on) capturing the files and metadata on the formatted disk. In another example, the structured source data may include relational data (e.g., tabular data), and the snapshot may include a database image (e.g., a .snp file, a structured query language (SQL) snapshot, and so on) storing the data and associated structure (e.g., rows, columns, and so on). In yet another example, the structured source data may include graphical data (e.g., a graph database), and the snapshot may include a database image (e.g., a .db file, a cypher snapshot archive, and so on) storing the data and associated structure (e.g., nodes, edges, and so on).

In some implementations, the client terminal may instruct the cloud environment 115 to generate the snapshot using the first credential (e.g., received from the input device as described above). For example, the client terminal may access the structured source data by transmitting the first credential to the cloud environment 115. Additionally, or alternatively, the client terminal may provide the first credential along with a command to generate the snapshot.

In some implementations, the client terminal may use an existing snapshot in lieu of instructing the cloud environment 115 to generate a new snapshot. For example, the client terminal may receive an indication of an existing snapshot to use from the input device. As an alternative, the client terminal may identify a most recent snapshot on the cloud environment 115 (e.g., from a backup folder including periodic snapshots) and use the identified snapshot.

As shown by reference number 125, the client terminal may assign a master encryption key to the source account. For example, the client terminal may authorize the source account to use the encryption key (e.g., from a KDC or another key repository accessible by the central account). In some implementations, the client terminal may instruct the cloud environment 115 to authorize the source account to use the master encryption key using a credential associated with the central account. For example, the client terminal may retrieve the credential associated with the central account from one or more memories. As an alternative, the input device may additionally provide the credential associated with the central account.

In some implementations, the client terminal may authorize a first role within the first account to use the master encryption key. For example, the first account may include multiple roles, and the client terminal may authorize one of the roles to use the master encryption key. The authorized role may be associated with snapshot copy jobs and/or with the client terminal.

As shown by reference number 130, the client terminal may track authorizations of the master encryption key. For example, the client terminal may track which accounts are authorized to use the master encryption key. In some implementations, the client terminal may track the authorizations using a data store on the cloud environment. For example, the data store may be associated with the central account, as shown in FIG. 1A.

In some implementations, the client terminal may track the authorizations by recording an identifier of the first account in the data store, on the cloud environment 115, based on authorizing the first account to use the master encryption key. The identifier may include a username, an account number, a nickname, and/or another alphanumeric, symbolic, hexadecimal, or other identifier associated with the first account.

Figure 1B:
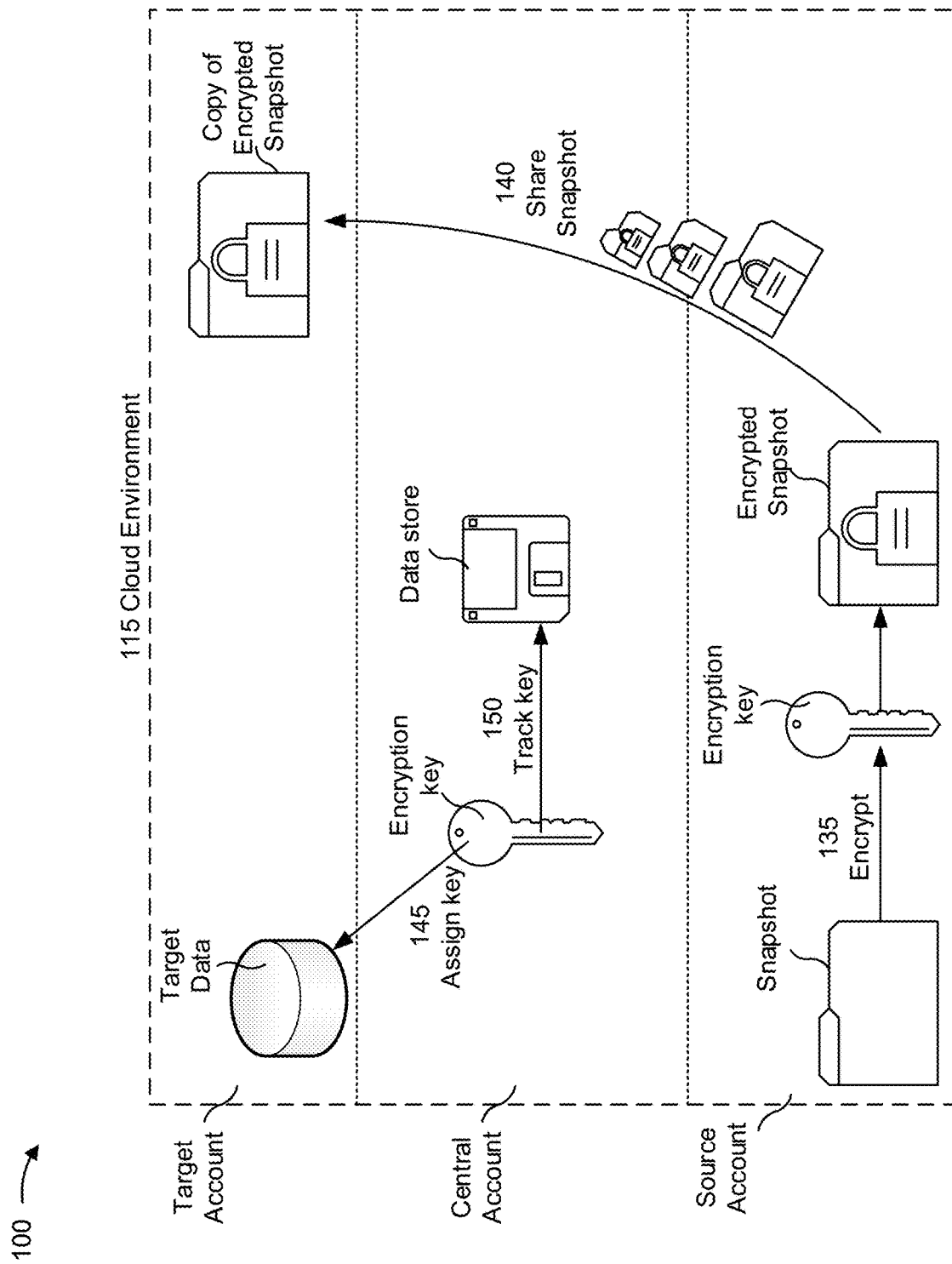

As shown in FIG. 1B, and by reference number 135, the client terminal may instruct the cloud environment 115 to encrypt the snapshot using the master encryption key. For example, the cloud environment 115 may decrypt the snapshot using a local encryption key associated with the first account and encrypt the snapshot using the master encryption key such that the master encryption key replaces the local encryption key associated with the first account. Accordingly, the snapshot may be securely shared with the second account (as described below) without sharing the first account's local encryption key. Many cloud services do not allow local encryption keys to be shared because the sharing would result in vulnerabilities to all data encrypted with the local encryption key associated with the first account.

As shown by reference number 140, the client terminal may instruct the cloud environment 115 to copy the encrypted snapshot to another encrypted snapshot associated with the second account. Accordingly, the encrypted snapshot associated with the first account may be referred to as a "first snapshot," and the copy may be referred to as a "second snapshot." In some implementations, the client terminal may instruct the cloud environment 115 to copy the encrypted snapshot using the second credential (e.g., received from the input device as described above). For example, the client terminal may provide the second credential along with a command to copy the first snapshot.

As shown by reference number 145, the client terminal may assign the master encryption key to the target account. For example, the client terminal may authorize the target account to use the encryption key (e.g., from a KDC or another key repository accessible by the central account). In some implementations, the client terminal may instruct the cloud environment 115 to authorize the target account to use the master encryption key using the credential associated with the central account (as described above).

In some implementations, the client terminal may authorize a second role within the second account to use the master encryption key. For example, the second account may include multiple roles, and the client terminal may authorize one of the roles to use the master encryption key. The authorized role may be associated with snapshot copy jobs and/or with the client terminal.

As shown by reference number 150, the client terminal may continue to track authorizations of the master encryption key. For example, the client terminal may track which accounts are authorized to use the master encryption key. In some implementations, the client terminal may track the authorizations using the data store associated with the central account, as shown in FIG. 1B and described above.

In some implementations, the client terminal may track the authorizations by recording an identifier of the second account in the data store, within the cloud environment 115, based on authorizing the second account to use the master encryption key. As described above, the identifier may include a username, an account number, a nickname, and/or another alphanumeric, symbolic, hexadecimal, or other identifier associated with the second account.

Figure 1C:
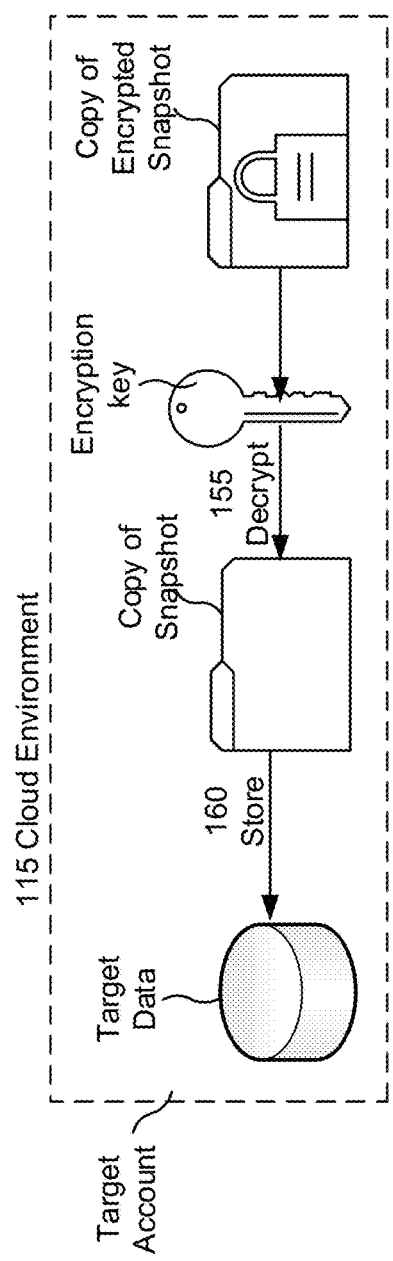

As shown in FIG. 1C, and shown by reference number 155, the client terminal may instruct the cloud environment 115 to decrypt the second snapshot using the master encryption key. Accordingly, the cloud environment 115 may generate structured target data based on decrypting the second snapshot. The structured target data may include a relational data structure with the same schema as the structured source data. Additionally, or alternatively, the structured target data may include a block storage volume with the same metadata as the structured source data. Accordingly, the structure is preserved as the source data associated with the first account is copied to the target data associated with the second account.

As shown by reference number 160, the client terminal may instruct the cloud environment 115 to store the structured target data in association with the second account. For example, the cloud environment 115 may decrypt the second snapshot using the master encryption key and encrypt the structured target data using a local encryption key associated with the second account such that the local encryption key associated with the second account replaces the master encryption key. Accordingly, the snapshot will have been securely shared with the second account without sharing the second account's local encryption key. As noted above, many cloud services do not allow local encryption keys to be shared because the sharing would result in vulnerabilities to all data encrypted with the local encryption key associated with the second account.

In some implementations, the client terminal may additionally or alternatively instruct the cloud environment 115 to perform a cross-region copy. For example, the client terminal may instruct the cloud environment 115 to copy the second snapshot, associated with the second account, from a first region (e.g., including servers or computing hardware physically located in a first geographic region) to a second region (e.g., including servers or computing hardware physically located in a second geographic region) before decrypting the second snapshot. As an alternative, the client terminal may instruct the cloud environment 115 to copy the decrypted second snapshot from the first region to the second region before storing the structured target data in the second region.

In some implementations, the client terminal may perform batch jobs. For example, the client terminal may copy multiple snapshots from the first account to the second account. Accordingly, the client terminal may, using the first credential, instruct the cloud environment 115 to generate another snapshot (also called a "third snapshot") of additional structured source data (also called "second structured source data") associated with the first account. The client terminal may further instruct the cloud environment 115 to encrypt the third snapshot using the master encryption key. The client terminal may, using the second credential, instruct the cloud environment 115 to copy the third snapshot to another snapshot associated with the second account (also called a "fourth snapshot"). The client terminal may further instruct the cloud environment 115 to decrypt the fourth snapshot using the master encryption key and generate additional structured target data (also called "second structured target data"), associated with the second account, based on the decryption.

Additionally, or alternatively, the client terminal may copy multiple snapshots from different accounts to the second account. For example, the client terminal may copy, to the second account, at least one snapshot from a third account in addition to one or more snapshots from the first account. Accordingly, the client terminal may, using the third credential, instruct the cloud environment 115 to generate another snapshot (also called a "third snapshot" or a "fifth snapshot" when combined with copying multiple snapshots from the first account to the second account) of additional structured source data associated with the third account (also called "second structured source data" or "third structured source data" when combined with copying multiple snapshots from the first account to the second account). The client terminal may further instruct the cloud environment 115 to encrypt the fifth snapshot using the master encryption key. The client terminal may, using the second credential, instruct the cloud environment 115 to copy the fifth snapshot to another snapshot associated with the second account (also called a "fourth snapshot" or a "sixth snapshot" when combined with copying multiple snapshots from the first account to the second account). The client terminal may further decrypt the sixth snapshot using the master encryption key and generate additional structured target data (also called "second structured target data" or "third structured target data" when combined with copying multiple snapshots from the first account to the second account), associated with the second account, based on the decryption.

Additionally, or alternatively, the client terminal may copy multiple snapshots from the first account to different accounts. For example, the client terminal may copy, from the first account, at least one snapshot to a third account in addition to one or more snapshots to the second account. Accordingly, the client terminal may, using the first credential, instruct the cloud environment 115 to generate another snapshot (also called a "third snapshot" or a "fifth snapshot" when combined with copying multiple snapshots from the first account to the second account) of additional structured source data associated with the first account (also called "second structured source data" or "third structured source data" when combined with copying multiple snapshots from the first account to the second account). The client terminal may further instruct the cloud environment 115 to encrypt the fifth snapshot using the master encryption key. The client terminal may, using the third credential, instruct the cloud environment 115 to copy the fifth snapshot to a snapshot associated with the third account (also called a "fourth snapshot" or a "sixth snapshot" when combined with copying multiple snapshots from the first account to the second account). The client terminal may further decrypt the sixth snapshot using the master encryption key and generate additional structured target data (also called "second structured target data" or "third structured target data" when combined with copying multiple snapshots from the first account to the second account), associated with the third account, based on the decryption.

In some implementations, the first account, the second account, and/or another account (e.g., the third account or the fourth account described above) may serve as a source account for one copy task in a batch job and serve as a target account for another copy task in the batch job. For example, the client terminal may copy, to the first account, at least one snapshot from a third account in addition to copying one or more snapshots, from the first account, to the second account. Accordingly, the client terminal may, using the third credential, instruct the cloud environment 115 to generate another snapshot (also called a "third snapshot" or a "fifth snapshot" when combined with copying multiple snapshots from the first account to the second account) of additional structured source data associated with the third account (also called "second structured source data" or "third structured source data" when combined with copying multiple snapshots from the first account to the second account). The client terminal may further instruct the cloud environment 115 to encrypt the fifth snapshot using the master encryption key. The client terminal may, using the first credential, instruct the cloud environment 115 to copy the fifth snapshot to another snapshot associated with the first account (also called a "fourth snapshot" or a "sixth snapshot" when combined with copying multiple snapshots from the first account to the second account). The client terminal may further decrypt the sixth snapshot using the master encryption key and generate additional structured target data (also called "second structured target data" or "third structured target data" when combined with copying multiple snapshots from the first account to the second account), associated with the first account, based on the decryption.

When executing batch jobs, the client terminal may store a stop file in a memory that can be used to halt a currently-executing batch job. For example, the stop file may include a termination script that a user (e.g., using the input device) may execute such that the batch job ends, all accounts are deauthorized from using the master encryption key, and all snapshots created on the cloud environment 115 are deleted, leaving any remaining copy tasks in the batch job incomplete. Accordingly, the client terminal may generate the stop file based on which accounts are included in the batch job and which snapshots will be generated and copied while executing the batch job. For example, the client terminal may compute, in advance of starting the batch job, which steps will be executed to complete the copy tasks included in the batch job and generate the stop file based on the computed steps.

Figure 1D:
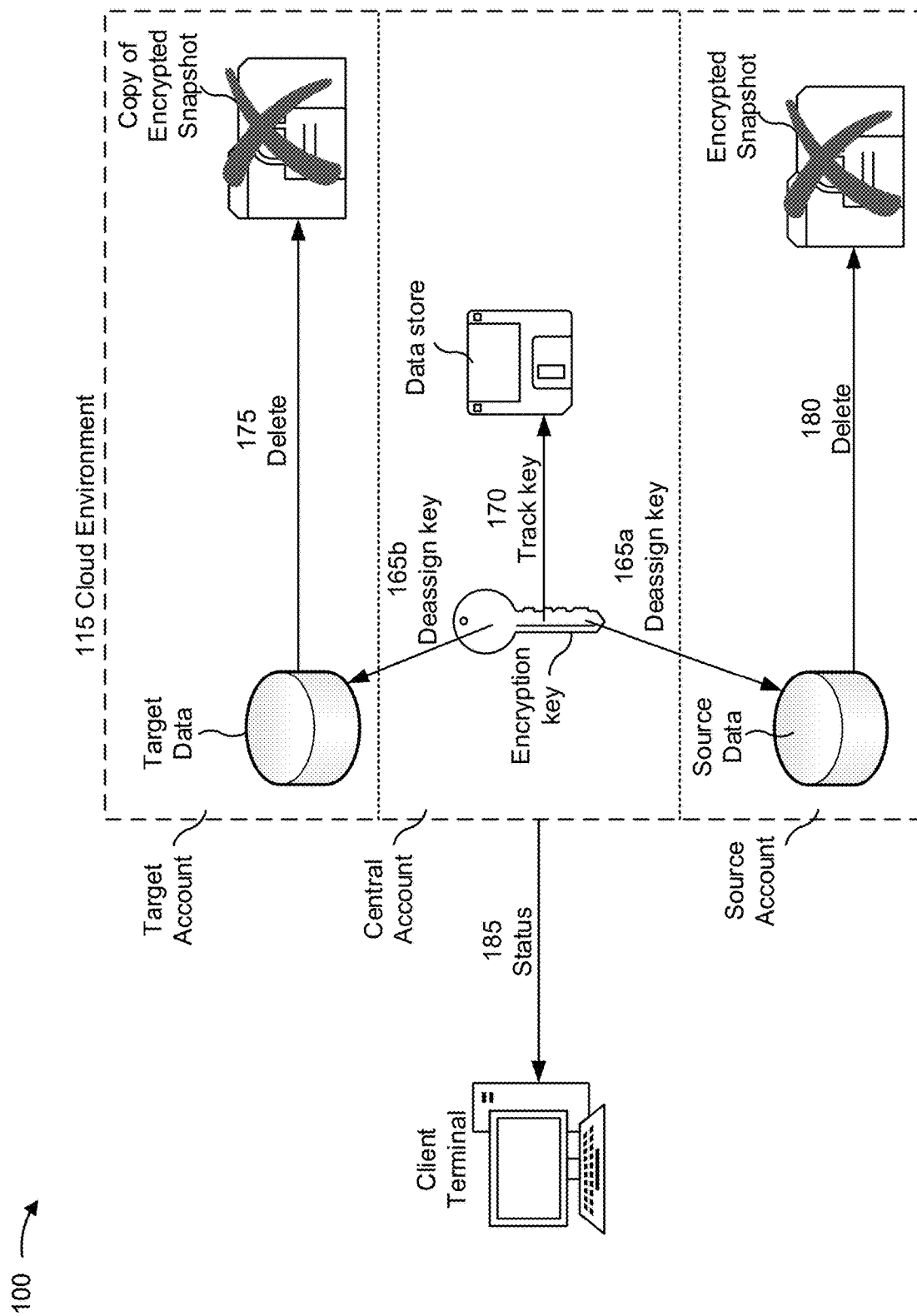

As shown in FIG. 1D, and shown by reference number 165a, the client terminal may deauthorize the first account from using the master encryption key. In some implementations, the client terminal may deauthorize the first account based on determining that no additional jobs are associated with the first account. For example, when the client terminal executes a batch job (as described above), the client terminal may leave the first account authorized to use the master encryption key until no jobs are left that use the first account as a source account or a target account. Similarly, as shown by reference number 165b, the client terminal may deauthorize the second account from using the master encryption key. In some implementations, the client terminal may deauthorize the second account based on determining that no additional jobs are associated with the second account. For example, when the client terminal executes a batch job (as described above), the client terminal may leave the second account authorized to use the master encryption key until no jobs are left that use the second account as a source account or a target account.

In some implementations, the client terminal may determine that no additional jobs are associated with the first account based on an indication in the data store that no additional jobs are associated with the first account. For example, when executing a batch job, the client terminal may record, in the data store, one or more indicators of the tasks included in the batch job in association with the identifier of the first account. The one or more indicators may include an integer indicating a number of jobs (such that a zero value indicates that no additional jobs are associated with the first account), an identifier (e.g., alpha-numeric, symbolic, hexadecimal, and/or other identifier) associated with each job (such that a lack of identifiers indicates that no additional jobs are associated with the first account), and so on. Similarly, the client terminal may determine that no additional jobs are associated with the second account based on an indication in the data store that no additional jobs are associated with the second account.

As shown by reference number 170, the client terminal may track deauthorizations of the master encryption key. For example, the client terminal may remove the identifier of the first account from the data store based on deauthorizing the first account from using the master encryption key. Similarly, the client terminal may remove the identifier of the second account from the data store based on deauthorizing the second account from using the master encryption key.

As shown by reference number 175, the client terminal may instruct the cloud environment 115 to delete the first snapshot based on generation of the structured target data. Similarly, as shown by reference number 180, the client terminal may instruct the cloud environment 115 to delete the second snapshot based on generation of the structured target data. In some implementations, the client terminal may instruct the cloud environment 115 to delete the first and second snapshots based on completing a copy task from the first account to the second account. As an alternative, the client terminal may instruct the cloud environment 115 to delete the first and second snapshots based on completing all pending copy tasks (e.g., all tasks in a batch job). In implementations where additional snapshots are generated, the client terminal may similarly instruct the cloud environment 115 to delete those additional snapshots (e.g., when a corresponding copy task is completed or when a corresponding batch job is finished).

As shown by reference number 185, the client terminal may output an indicator of completion. For example, the client terminal may output, to a console window, one or more status updates throughout the process described above, followed by the indicator of completion. Additionally, or alternatively, the client terminal may write a log file (e.g., as described below with respect to FIG. 2) that includes one or more status updates throughout the process described above, as well as the indicator of completion.

By using the techniques described above, the client terminal can securely copy structured data, while preserving the structure thereof, from one account to another account in a cloud environment. As a result, the client terminal can automatically copy structured data across accounts with greater speed, accuracy, and security than existing techniques. Additionally, in some implementations, the client terminal can further copy the structured data across regions. As a result, the client terminal can automatically copy structured data across regions with greater speed, accuracy, and security than existing techniques. Additionally, in some implementations and as described above, the client terminal can also process batch jobs. Accordingly, the client terminal can reuse a master encryption key across jobs to further increase speed and efficiency.

As indicated above, FIGS. 1A-1D are provided as an example. Other examples may differ from what is described with regard to FIGS. 1A-1D.

FIG. 2 is a diagrams of an example 200 associated with a log file output when transferring snapshots for cloud-based storage across accounts. As shown in FIG. 2, example 200 includes output from an executable or script called "rxcopy," which may instruct a cloud environment as described above with respect to FIGS. 1A-1D. Moreover, the executable or script may output status updates and/or an indicator of completion to a console screen and/or a log file, such as an extensible markup language (XML) file, a JavaScript object notation (JSON) file, a YAML file, and/or another file storing data serialization in a human- and machine-readable format. The log file is "status-standalone-1.yaml" in example 200.

As shown in FIG. 2, the log file may include an array, a list, or another similar data structure ("jobStatusRequests" in example 200) with corresponding information for each copy task in progress. Although described below with respect to a single job, the description similarly applies to a log file that includes corresponding information for each task of a batch job.

As further shown in FIG. 2, the log file may include one or more identifiers associated with the copy task, such as a numeric identifier ("id" in example 200), an alphanumeric identifier ("jobID" in example 200), a nickname ("jobName" in example 200), and so on. Additionally, the log file may include one or more status indicators associated with the copy task, such as a Boolean ("isRunning" in example 200), a string ("jobStatus" in example 200), an integer ("percentProgress" in example 200), and so on. Accordingly, in example 200, a "percentProgress" value of 100 and/or a "job Status" of "completed" may be the indicator of completion described above with respect to FIGS. 1A-1D. In some implementations, the log file may include additional information associated with the copy task, such as a duration ("jobDuration" in example 200), a start date/time ("startTimeStamp" in example 200), an end date/time ("endTimeStamp" in example 200), and so on. Additionally, or alternatively, the log file may include an identifier of the source account used in the copy task ("sourceAwsAccountNumber" in example 200), an identifier of the first snapshot used in the copy task ("sourceSnapshotArn" in example 200), an identifier of the first region storing the first snapshot ("sourceSnapshotRegion in example 200), an identifier of the target account used in the copy task ("targetAwsAccountNumber" in example 200), an identifier of the second snapshot used in the copy task ("targetSnapshotArn" in example 200), an identifier of the second region storing the second snapshot ("targetSnapshotRegion in example 200), and so on. In some implementations, the executable or script may generate an identifier associated with each step of the copy task (e.g., each step as described above with respect to FIGS. 1A-1D) such that the log file may include the identifier for a current step being performed ("stepFunctionExecutionName" in example 200). Additionally, or alternatively, the cloud environment may generate the identifier for each step that the cloud environment performs in response to instructions from the executable or script.

As indicated above, FIG. 2 is provided as an example. Other examples may differ from what is described with regard to FIG. 2.

Figure 3:
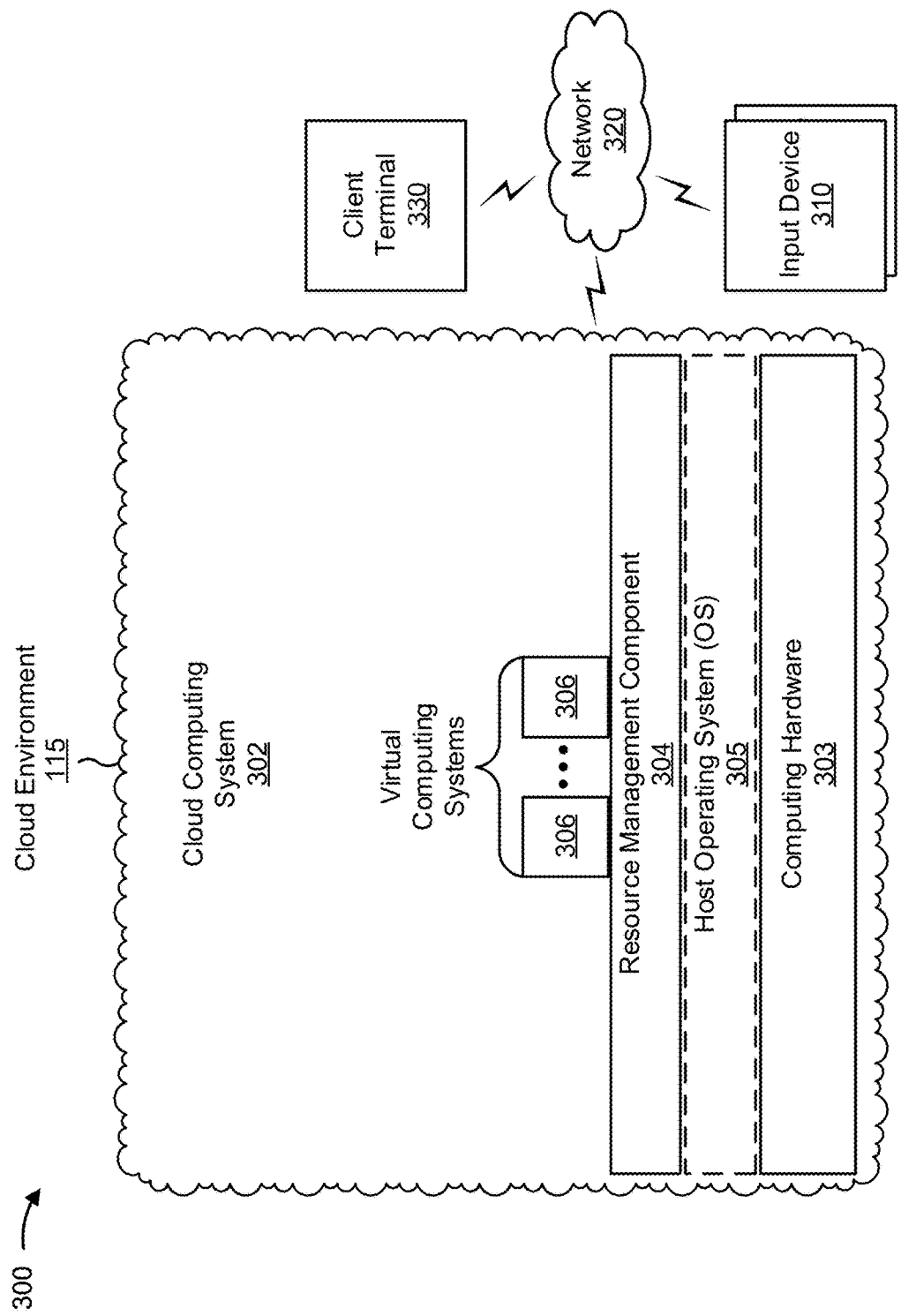
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a cloud environment 115, which may include one or more elements of and/or may execute within a cloud computing system 302. The cloud computing system 302 may include one or more elements 303-306, as described in more detail below. As further shown in FIG. 3, environment 300 may include an input device 310, a network 320, and/or a client terminal 330. Devices and/or elements of environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. Examples of computing hardware are described elsewhere herein (e.g., with respect to FIG. 4).

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines. Additionally, or alternatively, the resource management component 304 may include a container manager, such as when the virtual computing systems 306 are containers. In some implementations, the resource management component 304 executes within and/or in coordination with a host operating system 305.

A virtual computing system 306 includes a virtual environment that enables cloud-based execution of operations and/or processes described herein using computing hardware 303. A virtual computing system 306 may execute one or more applications using a file system that includes binary files, software libraries, and/or other resources required to execute applications on a guest operating system (e.g., within the virtual computing system 306) or the host operating system 305.

Although the cloud environment 115 may include one or more elements 303-306 of the cloud computing system 302, may execute within the cloud computing system 302, and/or may be hosted within the cloud computing system 302, in some implementations, the cloud environment 115 may not be cloud-based (e.g., may be implemented outside of a cloud computing system) or may be partially cloud-based. For example, the cloud environment 115 may include one or more devices that are not part of the cloud computing system 302, such as device 400 of FIG. 4, which may include a standalone server or another type of computing device. The cloud environment 115 may perform one or more operations and/or processes described in more detail elsewhere herein.

The input device 310 may include one or more devices capable of receiving, generating, storing, processing, and/or providing credentials (e.g., for one or more accounts on the cloud environment 115). The input device 310 may include a communication device and/or a computing device. For example, the input device 310 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. Additionally, or alternatively, the input device 310 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The input device 310 may transmit credentials (e.g., to client terminal 330) and receive a log file (e.g., as described above with respect to FIG. 2) in response.

Network 320 includes one or more wired and/or wireless networks. For example, network 320 may include a cellular network, a public land mobile network (PLMN), a local area network (LAN), a wide area network (WAN), a private network, the Internet, and/or the like, and/or a combination of these or other types of networks. The network 320 enables communication among the devices of environment 300.

The client terminal 330 may include one or more devices capable of receiving, generating, storing, processing, and/or providing commands (e.g., to the cloud environment 115). The input device 310 may include a communication device and/or a computing device. For example, the input device 310 may include a wireless communication device, a UE, a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an IoT device, or a similar type of device. Additionally, or alternatively, the input device 310 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The input device 310 may receive credentials (e.g., from the input device 310) transmit commands (e.g., using those credentials) to cause the cloud environment 115 to automatically and securely transfer structured data across accounts and/or regions. In some implementations, the input device 310 and the client terminal 330 may be at least partially integrated.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
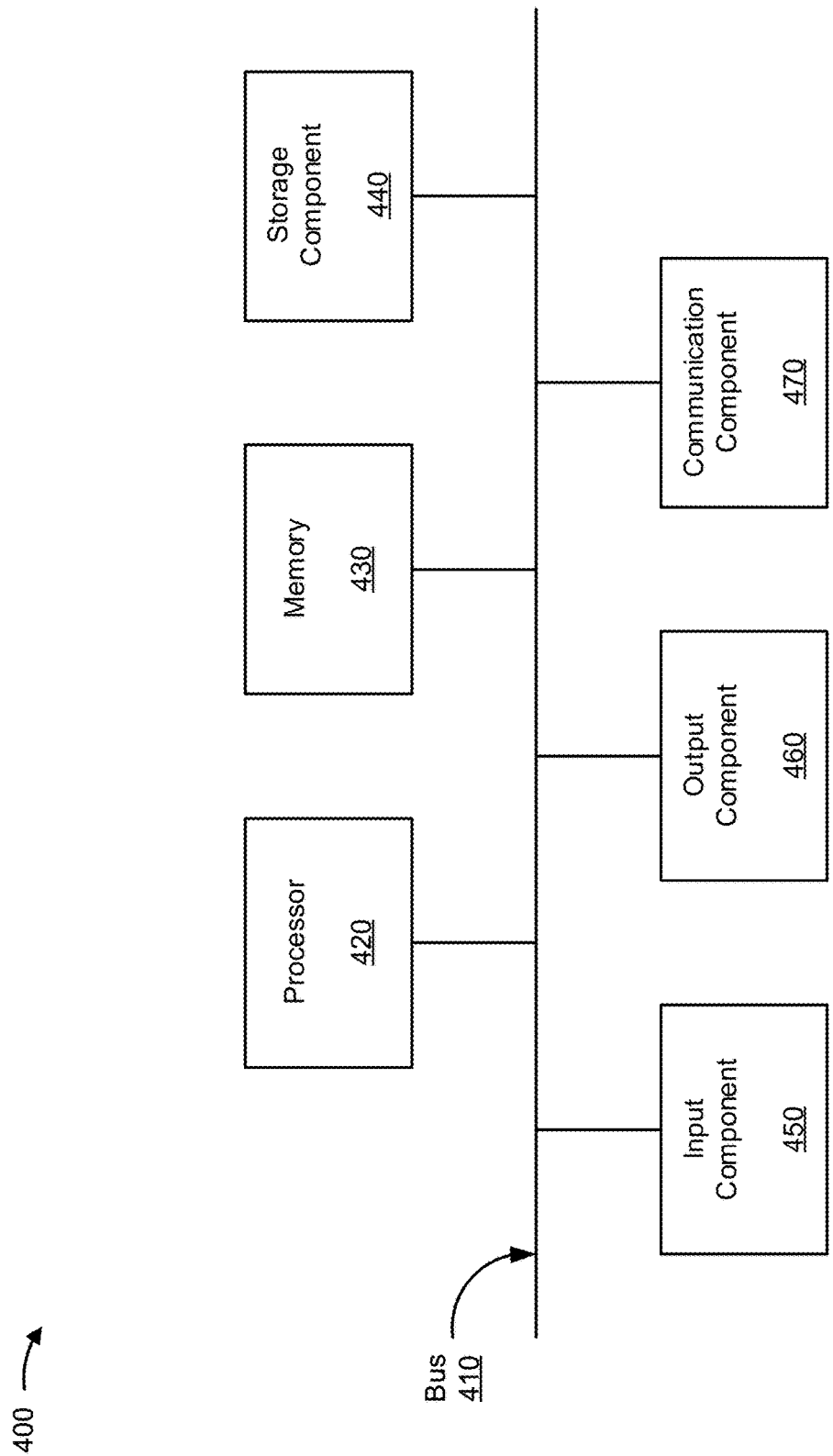
FIG. 4 is a diagram of example components of one or more devices of FIG. 3.

FIG. 4 is a diagram of example components of a device 400, which may correspond to input device 310 and/or client terminal 330. In some implementations, input device 310 and/or client terminal 330 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, and/or an actuator. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, and/or an antenna.

Device 400 may perform one or more processes described herein. For example, a non-transitory computer-readable medium (e.g., memory 430 and/or storage component 440) may store a set of instructions (e.g., one or more instructions, code, software code, and/or program code) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flowchart of an example process 500 associated with snapshot transfer for cloud-based storage across accounts. In some implementations, one or more process blocks of FIG. 5 may be performed by a system (e.g., client terminal 330). In some implementations, one or more process blocks of FIG. 5 may be performed by another device or a group of devices separate from or including the system, such as input device 310 and/or cloud environment 115. Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include instructing the cloud service, using a first credential, to generate a first snapshot of first structured source data associated with the first account (block 510). In some implementations, the first credential is associated with a first account for a cloud service. As further shown in FIG. 5, process 500 may include authorizing the first account to use a master encryption key (block 520). As further shown in FIG. 5, process 500 may include instructing the cloud service to encrypt the first snapshot using the master encryption key (block 530). As further shown in FIG. 5, process 500 may include instructing the cloud service, using a second credential, to copy the first snapshot to a second snapshot associated with the second account (block 540). In some implementations, the second credential is associated with a second account for the cloud service. As further shown in FIG. 5, process 500 may include authorizing the second account to use a master encryption key (block 550). As further shown in FIG. 5, process 500 may include instructing the cloud service to decrypt the second snapshot using the master encryption key and generate first structured target data, associated with the second account, based on the decryption (block 560). In some implementations, at least some steps described with respect to blocks 510-560 may be repeated to perform a batch job. For example, the batch job may include copying second structured source data (e.g., associated with the first account, the second account, a third account, and so on) to second structured target data (e.g., associated with the first account, the second account, the third account, and so on), copying third structured source data (e.g., associated with the first account, the second account, the third account, and so on) to second structured target data (e.g., associated with the first account, the second account, the third account, and so on), and so on. As further shown in FIG. 5, process 500 may include deauthorizing the first account and the second account from using the master encryption key (block 570). As further shown in FIG. 5, process 500 may include outputting an indicator of completion to a user device (block 580).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A device, comprising:
   one or more memories; and
   one or more processors, coupled to the one or more memories, configured to:
      authorize a first account and a second account to use a master encryption key;
      provide instructions to a cloud service to encrypt a first snapshot of the first account using the master encryption key;
      provide instructions to the cloud service, using a credential associated with the second account, to copy the first snapshot to a second snapshot associated with the second account;
      provide instructions to the cloud service to decrypt the second snapshot using the master encryption key and generate structured data, associated with the second account, based on the decryption; and
      deauthorize, based on a condition associated with a quantity of jobs related to at least one of the first account or the second account being satisfied, the first account and the second account from using the master encryption key; and
      output an indication associated with completion.

2. The device of claim 1, wherein the credential is a second credential, and
   wherein the first snapshot is generated based on a first credential associated with the first account.

3. The device of claim 1, wherein the first snapshot is associated with structured data.

4. The device of claim 1, wherein the structured data is structured target data, and wherein the first snapshot is associated with structured source data that comprises a relational data structure with a schema or metadata.

5. The device of claim 1, wherein the master encryption key is associated with a third account associated with the cloud service.

6. The device of claim 1, wherein the one or more processors are further configured to:
encrypt the structured data based on a local encryption key associated with the second account.

7. The device of claim 1, wherein the cloud service is configured to schedule execution of the instructions based on a load balancer.

8. A non-transitory computer-readable medium storing a set of instructions, the set of instructions comprising:
one or more instructions that, when executed by one or more processors of a device, cause the device to:
authorize a first account and a second account to use a master encryption key;
provide instructions to a cloud service to encrypt a first snapshot of the first account using the master encryption key;
provide instructions to the cloud service, using a credential associated with the second account, to copy the first snapshot to a second snapshot associated with the second account;
provide instructions to the cloud service to decrypt the second snapshot using the master encryption key and generate structured data, associated with the second account, based on the decryption;
deauthorize, based on a condition associated with a quantity of jobs related to at least one of the first account or the second account being satisfied, the first account and the second account from using the master encryption key; and
output an indication associated with completion.

9. The non-transitory computer-readable medium of claim 8, wherein the credential is a second credential, and
wherein the first snapshot is generated based on a first credential associated with the first account.

10. The non-transitory computer-readable medium of claim 8, wherein the first snapshot is associated with the structured data.

11. The non-transitory computer-readable medium of claim 8, wherein the generated structured data is structured target data, and
wherein the first snapshot is associated with structured source data that comprises a relational data structure with a schema or metadata.

12. The non-transitory computer-readable medium of claim 8, wherein the master encryption key is associated with a third account associated with the cloud service.

13. The non-transitory computer-readable medium of claim 8, wherein the one or more instructions further cause the device to:
encrypt the generated structured data based on a local encryption key associated with the second account.

14. The non-transitory computer-readable medium of claim 8, wherein the one or more instructions further cause the device to schedule execution of the instructions based on a load balancer.

15. A method, comprising:
authorizing, by a device, a first account and a second account to use a master encryption key;
providing, by the device, instructions to a cloud service to encrypt a first snapshot of the first account using the master encryption key;
providing, by the device, instructions to the cloud service, using a credential associated with the second account, to copy the first snapshot to a second snapshot associated with the second account;
providing, by the device, instructions to the cloud service to decrypt the second snapshot using the master encryption key and generate structured data, associated with the second account, based on the decryption;
deauthorizing, by the device, and based on a condition associated with a quantity of jobs related to at least one of the first account or the second account being satisfied, the first account and the second account from using the master encryption key; and
outputting, by the device, an indication associated with completion.

16. The method of claim 15, wherein the credential is a second credential, and
wherein the first snapshot is generated based on a first credential associated with the first account.

17. The method of claim 15, wherein the first snapshot is associated with the structured data.

18. The method of claim 15, wherein the generated structured data is structured target data, and
wherein the first snapshot is associated with structured source data that comprises a relational data structure with a schema or metadata.

19. The method of claim 15, wherein the master encryption key is associated with a third account associated with the cloud service.

20. The method of claim 15, further comprising:
encrypting the generated structured data based on a local encryption key associated with the second account.

* * * * *